United States Patent [19]

Weldon, Jr.

[11] Patent Number: 4,723,246
[45] Date of Patent: Feb. 2, 1988

[54] INTEGRATED SCRAMBLER-ENCODER USING PN SEQUENCE GENERATOR

[75] Inventor: Edward J. Weldon, Jr., Honolulu, Hi.

[73] Assignee: Tandem Computers Incorporated, Cupertino, Calif.

[21] Appl. No.: 759,491

[22] Filed: Jul. 25, 1985

Related U.S. Application Data

[63] Continuation of Ser. No. 377,099, May 11, 1982, abandoned.

[51] Int. Cl.⁴ ............................................. G06F 11/10
[52] U.S. Cl. .......................................... 371/42; 371/2; 371/47
[58] Field of Search ............... 371/2, 37, 47, 55, 56, 371/42; 375/115

[56] References Cited

U.S. PATENT DOCUMENTS

| | | | |
|---|---|---|---|
| 3,213,426 | 10/1965 | Melas | 371/37 |
| 3,227,999 | 1/1966 | Hagelbarger | 371/37 |
| 3,350,644 | 10/1967 | McNair | 375/115 X |
| 3,405,235 | 10/1968 | Carter | 371/55 X |
| 3,550,082 | 12/1970 | Tong | 371/42 |
| 3,629,505 | 12/1971 | Zegers et al. | 375/115 |
| 3,666,889 | 5/1972 | Zegers et al. | 375/115 X |
| 3,852,534 | 12/1974 | Tilk | 375/115 X |
| 3,854,011 | 12/1974 | Mallory et al. | 375/115 X |
| 3,920,894 | 11/1975 | Shirley et al. | 364/717 X |
| 4,133,974 | 1/1979 | Morgan | 375/115 X |
| 4,171,513 | 10/1979 | Otey et al. | 375/115 X |
| 4,202,051 | 5/1980 | Davida et al. | 364/717 X |
| 4,211,996 | 7/1980 | Nakamura | 371/37 |
| 4,309,694 | 1/1982 | Henry | 340/347 DD |
| 4,312,069 | 1/1982 | Ahamed | 371/37 |
| 4,341,925 | 7/1982 | Doland | 364/717 X |
| 4,377,863 | 3/1983 | Legory et al. | 371/42 |
| 4,410,989 | 10/1983 | Berlkamp | 371/37 |
| 4,416,010 | 12/1983 | Hibino et al. | 371/37 |

OTHER PUBLICATIONS

Peterson & Weldon, Error Correction Codes, 2nd Ed., MIT Press, 1972, Appendix C.

Primary Examiner—Charles E. Atkinson
Attorney, Agent, or Firm—Townsend and Townsend

[57] ABSTRACT

Simplified method and apparatus for performing integrated scrambling and encoding or descrambling and decoding of block code digital transmissions is disclosed. The method involves setting the scrambling length equal to an integer multiple of the block length, and then implementing a pseudorandom number sequence generator within the block length counter. The output of the pseudorandom number sequence generator is then logically combined with the incoming data to provide scrambled data, simplifying the complexity of the encoder or decoder significantly.

3 Claims, 3 Drawing Figures

INTEGRATED SCRAMBLER-ENCODER USING PN SEQUENCE GENERATOR

This is a continuation of application Ser. No. 377,099, filed May 11, 1982, now abandoned.

The present invention relates generally to communications equipment, and more particularly to digital transmission equipment implementing block coding techniques. For simplicity herein, the term coding is used to refer to error detecting and correcting coding.

Information transmission systems typically involve a data source, a modulator for converting the data from the data source into a form suitable for transmission, and a transmitter for placing the information on a communications channel. Functionally similar receiving equipment then receives the transmission from the channel, decodes it, and provides useful information to the user.

With the advent of digital communications, the need for highly reliable data transmission and reception required improvements in the relatively simple transmissions system discussed above. One improvement was the development of coding techniques which assisted in assuring the integrity of the system, such as block coding. Associated with such coding techniques was the requirement for a block encoder circuit to be included with the transmission system, and a corresponding decoder to be associated with the receiver system.

Associated with digital systems of all types was the problem of naturally occurring constant character strings—that is, long strings of either all ones or all zeros—which tended to disrupt the integrity of the data because of synchronization problems. To help resolve this problem, scrambler circuits were introduced to predictably eliminate such problematic character strings. Basic to most scramblers is a pseudorandom (PN) sequence generator, the output of which is exclusive-or'ed with the data to be scrambled. However, the tradeoff in making such an improvement is that the transmission system became additionally complex, causing increased opportunity for failure. Likewise, the addition of an extra component into the transmission system increased power consumption, and other associated ills.

Thus, while the advantages of data integrity provided by scrambling and coding techniques are desirable, obtaining these advantages has thus far required acceptance of significantly increased complexity of the transmission system, together with greater power consumption, larger size, increased part count, and greater heat dissipation.

The present invention provides the advantages of employing coding and scrambling techniques in a transmission system, while at the same time substantially reducing the negative factors associated with convention implementations of such techniques.

These goals are accomplished in the present invention by integrating together the encoding and scrambling techniques. Similarly, the benefits of the present invention may be successfully implemented during decoding and descrambling in a manner which will be apparent to those skilled in the art from the discussion herein. The first step in accomplishing this is to set the block length of the encoder equal to an integer multiple of the period of the scrambler. Then, by constructing the block counter from a pseudorandom sequence generator, the counter can be made to provide both a count function as well as a PN Sequence function. The output of the PN sequence generator may then be combined with the data stream to yield scrambled data, without the need for a separate PN sequence generator. As a result, both goals are accomplished with a minimum of system resources.

It is therefore one object of the present invention to provide an improved scrambling and error detecting and correcting encoding device suitable for use with digital communications systems.

It is another object of the present invention to provide an improved digital communications system.

It is yet another object of the present invention to provide an integrated block code encoding and scrambling circuit.

It is still another object of the present invention to provide an improved descrambling and decoding method and system.

These and other objects of the present invention will be better understood from the following detailed description, taken together with the attached Figures, in which FIG. 1 illustrates a digital communications systems into which the present invention may be advantageously incorporated, and FIG. 2 illustrates a schematic block diagram form the scrambler-encoder of the present invention.

FIG. 3 illustrates in detailed schematic form the counter/PN sequence generator of FIG. 2.

DETAILED DESCRIPTION OF THE INVENTION

Figure 1:
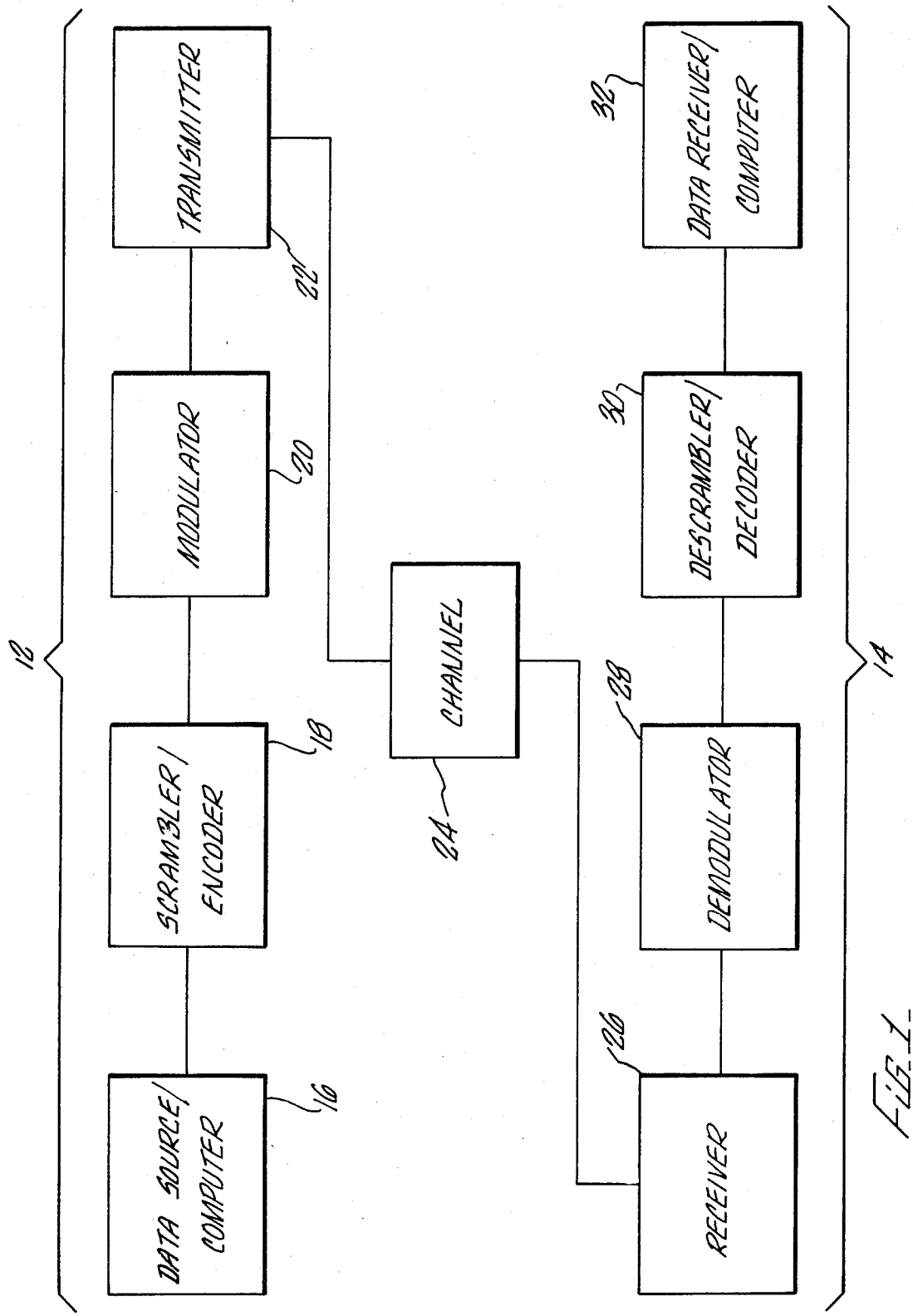

Referring first to FIG. 1, a digital communications system 10 including a transmitting section 12 and a receiving section 14 are illustrated. The transmitting section 12 includes a data source 16 which provides digital signals to a scrambler-encoder 18 of the present invention, which places the signals in block mode. The scrambled and encoded signals are then passed through a modulator 20 to condition them for transmission by a transmitter 22 onto any suitable channel 24. The transmitter 22 may, for example, include an earth station, and the channel 24 may employ microwave frequencies.

Similarly, the receiving section 14 includes a receiver 26 which picks up the modulated signals from the channel 24 and provides them to a demodulator 28. The demodulated signals are then provided to a descrambler-decoder 30 which corresponds to scrambler-encoder 18 and causes the digital signals to be returned to their original values. The signals are then provided to data receiver 32, such as another computer, and are operated on in the normal manner. A communications system in which the present invention is suitable for use is disclosed in co-pending U.S. patent application Ser. No. 377,093, now abandoned, entitled Satellite Communications System for Computer Networks, filed on even date herewith and assigned to the assignee of the present invention, incorporated herein by reference.

Figure 2:
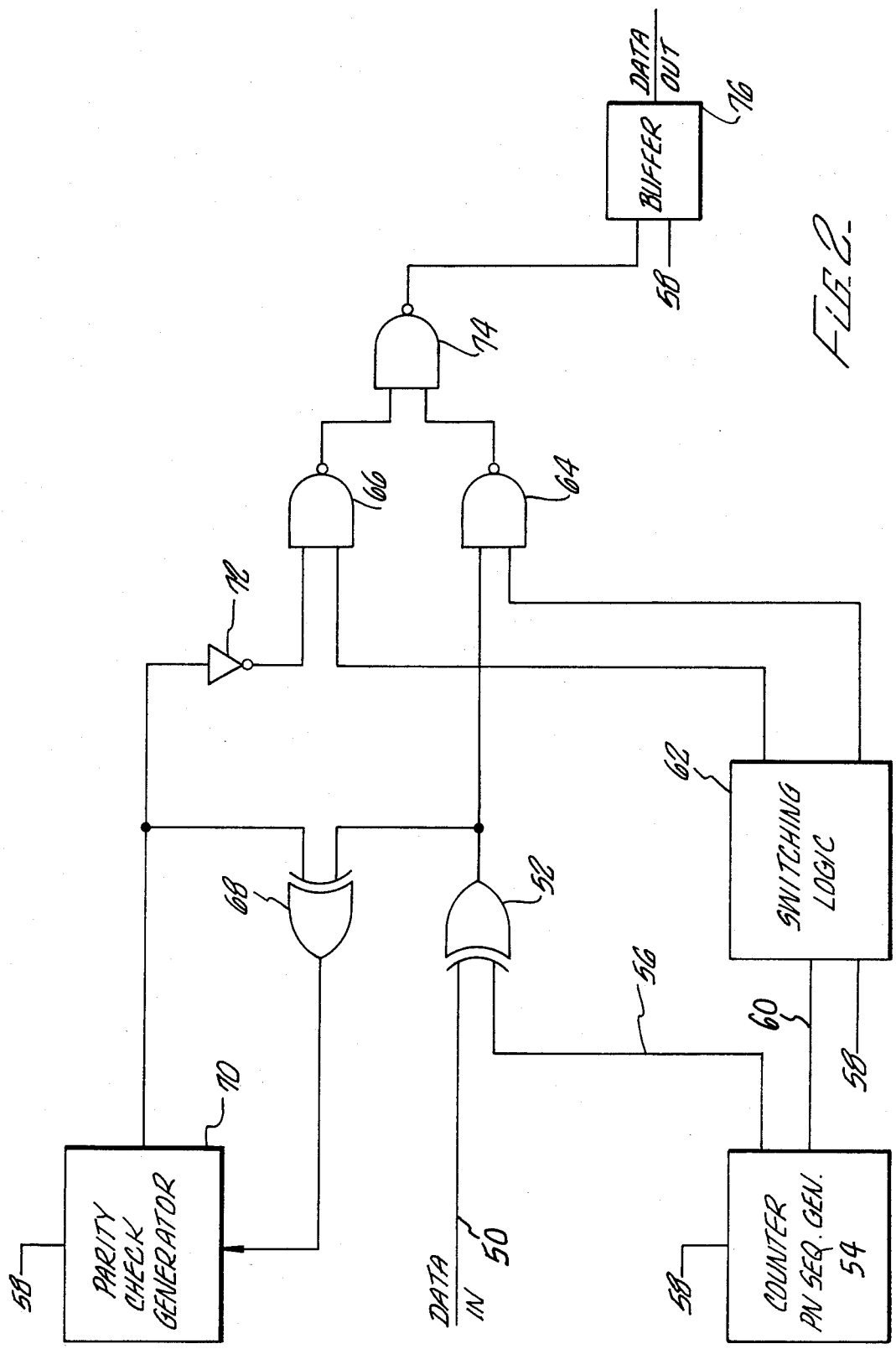

Referring next to FIG. 2, the scrambler-encoder of the present invention is shown in block diagram form. Incoming data is received on line 50 and provides one input to a two input exclusive-or gate 52. the remaining input to the gate 52 is received from a counter/PN sequence generator 54, described in greater detail in FIG. 3. In an exemplary embodiment, the counter/PN sequence generator is a seven stage counter which also generates a pseudorandom number sequence of period 127, with the output of the seventh stage provided on the line 56. The counter 54 is driven by a master clock input received on a line 58. It will be appreciated that the exclusive or gate 52 operates to combine the pseudorandom number sequence generated by the counter 54 with the incoming data received on the line 50, causing the output of the gate 52 to be scrambled data.

In addition, a plurality of the lines on the stages of the counter 54 are provided on output lines 60 to switching logic 62. The switching logic 62 also receives a clock input on the line 58. The switching logic 62, which may include two seven input and gates and a J-K flip flop, with the and gates providing the J and K inputs to the flip flop, provides true and complement outputs to a pair of two input nand gates 64 and 66. The purpose of these signals is to gate received data and the contents of a parity check generator 70 to the output buffer as appropriate. The second input to the gate 64 is provided by the output of the scrambler gate 52, which also provides one input to another exclusive-or gate 68. The exclusive or gate 68 completes a feedback loop around the parity check generator 70, such that the remaining input to the gate 68 is received from the output of the generator 70, and the output of the gate 68 provides one input to the generator 70. The generator also receives a clock input on the line 58.

The output of the parity check generator 70, which calculates the check bits needed for error detection and/or correction, is also provided to the gate 66 through an inverter 72. The output of the gates 64 and 66 are then combined in a nand gate 74, from which the output is provided to a data out buffer 76. The data out buffer may simply be a D flip flop which also receives a clock from the line 58.

The operation of the circuit of FIG. 2 may now be understood. During a portion of the block cycle, the counter 54 counts up as well as generating a pseudorandom sequence which is combined with the incoming data at the scrambling gate. At the same time, the parity generator generates parity bits, while the switching circuit monitors the state of the counter 54 and, for the time being, allows data to be output. When the counter reaches a predetermined point (112 for the circuit shown), the switching circuit inhibits the passage of data and causes the parity bits from the syndrome generator to be output. At the end of the block length (127 for the example shown), the ability of the circuit to pass data is restored, and the cycle repeats.

Figure 3:
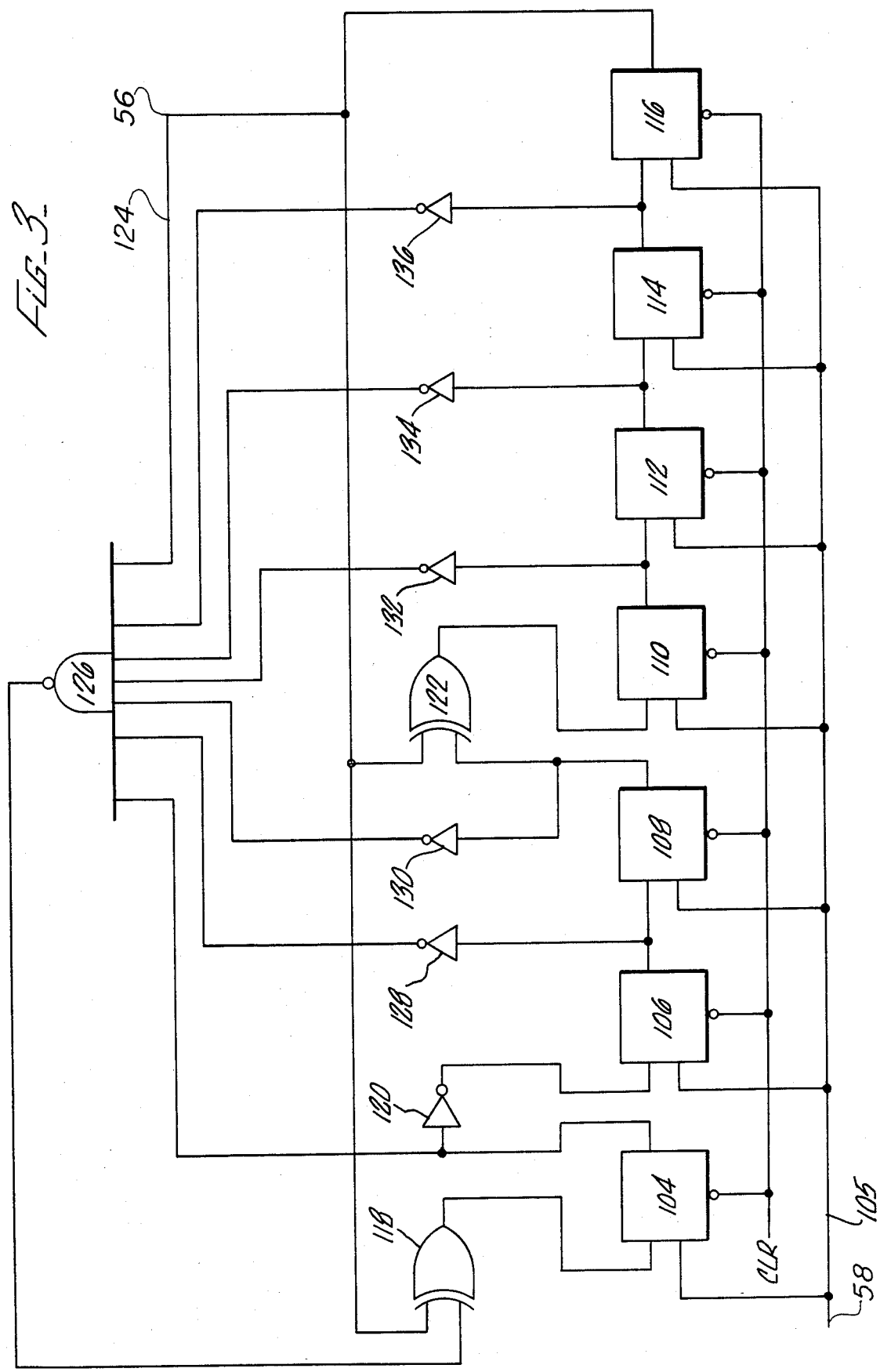

Referring now to FIG. 3, the counter/pseudorandom sequence generator 54 (FIG. 2) is illustrated in detailed schematic form. A D flip flop 104 receives a clock signal on a line 105, which clock signal is also provided to a plurality of additional flip flops 106, 108, 110, 112, 114, and 116. The D input to the flip flop 104 is received from a two input exclusive-or gate 118, which basically provides a feedback loop from the outputs of the counter as will be discussed hereinafter.

The Q output of the flip flop 104 is then provided to the second D flip flop 106 through an inverter 120. The true output of the flipflop 106 is then fed directly to the input of the flip flop 108. The true output of the flip flop 108 is then fed to one input of an exclusive-or gate 122, the remaining input to which is provided by the true output of the flip flop 116. The output of the exclusive-or gate 122 is then fed to the input of the flip flop 110. The flip flop 110 output feeds the input of the flip flop 112, which in turn feeds the remaining flip flops 114 and 116 in a like manner.

It will also be seen that the output of the flip flop 116, in addition to providing a scrambler output 56 on the line 124 and a feedback input to the gate 122, also provides another feedback input to the gate 118. The remaining input to the gate 118 is provided from a seven input nand gate 126, which receives as its inputs the complement outputs of the stages of the counter 54. The complement output of the flip flop 106 is formed by passing its output through an inverter 128; the remaining complement outputs are similarly formed through the use of inverters 130, 132, 134, and 136.

It can be seen that the flip flops 104 et seq. provide a counting function as required by a block length encoder; for the particular embodiment shown, the count length may be seen to be 127. Also, with the addition of feedback through the exclusive or gates 118 and 122, a pseudorandom sequence is also generated. As a result, the combination of the D flip-flops and the exclusive or gates provides a pseudo-random number sequence generator with a period of 127, while at the same time counting to 127 for a block code length of 127. Although in the present example the block length is equal to the length of the scrambling period, alternatively the length of the scrambling period could be set to any integer multiple of the block length.

While the foregoing of the present invention has involved the scrambling and encoding functions, the benefits of the present invention are equally applicable to the decoding and descrambling functions. It is believed that implementation of the present invention in such a device will be apparent to those skilled in the art, given the foregoing discussion, and as a result such a decoder will not be described in detail.

It can be seen that an integrated scrambler-encoder or descrambler-decoder has been disclosed, with the benefits of decreased complexity, increased reliability, and lower power dissipation. It will be appreciated that, while the embodiment of the present invention discussed in detail above includes seven stages, many different count lengths can be provided without varying from the intent of the present invention. Thus, other embodiments of PN Sequence Generators can be developed which use the polynomials discussed in Appendix C of *Error Correction Codes, Edition* 2, W. W. Peterson & E. J. Weldon, Jr., MIT Press 1972. It will therefore be appreciated that, while one embodiment has been discussed in detail, other alternatives and equivalents will be apparent to those skilled in the art given the teachings herein, and the appended claims are intended to encompass those equivalents and alternatives.

What is claimed is:

1. A scrambler suitable for use in a digital transmission communications system for transmitting blocks of data of preselected lengths having:
   counter means including an input and a plurality of stages operatively connected for counting blocks of data of said preselected lengths,
   exclusive-or means connected to receive the output of at least one of the stages and to provide feedback through said input to the counter means for causing the counter means to generate pseudorandom number of sequences, the counting stages operatively connected outputting the block length of the scrambled data as an integer multiple of the pseudorandom number sequence; and,
   output means for combining said input means and the pseudorandom number sequence of the counter means for supplying a scrambled output signal.

2. A scrambler for use in a digital transmission system for transmitting blocks of data having a preselected number of digits including
   input means for receiving data,
   block code scrambling means having an input and including a plurality of stages operatively connected for counting block code lengths having a preselected number of digits,
   scrambling means interconnected between at least one of the stages of the block code scrambling means and the input to the block code scrambling means for causing the operatively connected stages to generate pseudorandom number sequences, the counting stages as operatively connected outputting the block code length of the transmitted data as an integer multiple of the pseudorandom number sequences of the scrambling means; and
   output means for supplying a scrambled version of the data received by the input means combining the input means for receiving data and the block code scrambling means.

3. A scrambler for use in a digital transmission system for transmitting blocks of data of preselected lengths including:
   input means for receiving incoming data;
   clock means for generating clock signals;
   a counter having a clock input to generate counting, first and second counting outputs, and a scrambling output comprising a connection to at least one of the stages of said counter, the counting stages operatively connected outputting the block length of the combined group of data and parity bits being an integer multiple of a pseudorandom number sequence used to scramble the data;
   parity check generator means connected to said input means for receiving data for generating and storing parity data responsive to said passing data stream;
   switching logic means including a first output means responsive to the first output of said counter for gating data and second output means responsive to the second output of said counter for gating stored parity data from said parity check generator means;
   logic combination means including an exclusive OR gate for sequentially receiving data and parity bits on one input and the output of the pseudorandom number sequence of said counter on the other input to scramble sequentially data and parity bits.

* * * * *